United States Patent
Park (10) Patent No.: US 11,983,328 B2
(45) Date of Patent: May 14, 2024

(54) APPARATUS FOR RECOGNIZING GESTURE IN VEHICLE AND METHOD THEREOF

(71) Applicants: Hyundai Motor Company, Seoul (KR); Kia Corporation, Seoul (KR)

(72) Inventor: Sung Chan Park, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/744,940

(22) Filed: May 16, 2022

(65) Prior Publication Data

US 2023/0066415 A1 Mar. 2, 2023

(30) Foreign Application Priority Data

Sep. 1, 2021 (KR) ........................ 10-2021-0116581

(51) Int. Cl.
| | |
|---|---|
| *B60K 35/00* | (2024.01) |
| *B60W 40/08* | (2012.01) |
| *B60W 40/105* | (2012.01) |
| *B60W 50/14* | (2020.01) |
| *G06F 3/01* | (2006.01) |
| *G06V 20/59* | (2022.01) |
| *G06V 40/20* | (2022.01) |
| *B60K 35/10* | (2024.01) |
| *B60K 35/28* | (2024.01) |

(52) U.S. Cl.
CPC .............. *G06F 3/017* (2013.01); *B60K 35/00* (2013.01); *B60W 40/08* (2013.01); *B60W 40/105* (2013.01); *B60W 50/14* (2013.01); *G06V 20/59* (2022.01); *G06V 40/20* (2022.01); *B60K 35/10* (2024.01); *B60K 35/28* (2024.01); *B60K 2360/1464* (2024.01); *B60K 2360/164* (2024.01); *B60W 2040/0818* (2013.01); *B60W 2050/146* (2013.01); *B60W 2420/403* (2013.01); *B60W 2540/18* (2013.01); *B60W 2540/225* (2020.02)

(58) Field of Classification Search
CPC ................................................ B60K 2370/164
See application file for complete search history.

(56) References Cited

U.S. PATENT DOCUMENTS

| | | |
|---|---|---|
| 9,389,695 B2 | 7/2016 | Sivertsen |
| 2010/0185341 A1 | 7/2010 | Wilson et al. |
| (Continued) | | |

FOREIGN PATENT DOCUMENTS

| | | |
|---|---|---|
| KR | 101780282 B1 | 9/2017 |
| KR | 102232187 B1 | 3/2021 |

*Primary Examiner* — Rinna Yi
(74) *Attorney, Agent, or Firm* — Fox Rothschild LLP (57) ABSTRACT

An apparatus is configured to efficiently recognize a gesture by interworking with an infotainment system. The apparatus obtains information about the gesture of a user, is connected with the infotainment system of a vehicle to identify a state of the infotainment system, branches a gesture allowed in recognition, based on the state of the infotainment system, and performs gesture recognition, based on the information about the sensed gesture and a result of branching the gesture allowed in recognition. The apparatus addresses overload and reliability degradation problems according to continuous image recognition.

16 Claims, 7 Drawing Sheets

(56) References Cited

U.S. PATENT DOCUMENTS

| | | | | |
|---|---|---|---|---|
| 2012/0262403 | A1* | 10/2012 | Tissot | B60K 37/06 |
| | | | | 345/173 |
| 2014/0292695 | A1* | 10/2014 | Wakamoto | B60K 35/00 |
| | | | | 345/173 |
| 2019/0061526 | A1* | 2/2019 | Park | B60K 31/00 |
| 2019/0073546 | A1* | 3/2019 | Aoi | G06V 40/107 |
| 2019/0115016 | A1* | 4/2019 | Seok | G10L 15/22 |
| 2020/0159366 | A1* | 5/2020 | Matsuda | G06F 3/0488 |
| 2020/0368616 | A1* | 11/2020 | Delamont | G06T 19/006 |
| 2022/0171465 | A1* | 6/2022 | Luo | G06T 7/20 |

* cited by examiner

| TYPE | RECOGNIZABLE GESTURE | CORRESPONDING GESTURE USE PORTION | RELATED OPERATION |
|---|---|---|---|
| Head Action | Nod | System(POP UP) | OK Operation |
| | | Navi App | start navigation guidance when receiving Nod |
| | Shake | System(POP UP) | OK Operation |
| Head Gesture | Thumb Up | Media/Radio | Favorite/Recommend/Save function |
| | | Navi | Add POI (favorite) when receiving Thumb UP |
| | Silence | Media | Mute operation |
| | OK | Media | Play operation |
| | | Navi | start navigation guidance when receiving OK |
| | No.1/2/3 | VR/Navi | In case of selectable menu, it is recognized and selected as 1,2,3 |
| | Wave hand (left,right) | Media/Radio | Next song/Previous song (Seek up/down) |
| | Thumb left | System | End (Back) |
| | | Media | Seek Up |
| | Thumb right | Media | Seek down |
| | Palm | System | Switch to home screen |

FIG.3

| TYPE | RECOGNIZABLE GESTURE | | GESTURE RECOGNIZABLE CONDITION | | | NOTES (EXCEPTION CONDITION) |
|---|---|---|---|---|---|---|
| | | | VEHICLE DRIVING INFORMATION | NAVIGATION ROAD INFORMATION | DRIVING STATE INFORMATION THROUGH SENSOR DEVICE | |
| COMMON CONDITION | COMMON | | VEHICLE SPEED OF 130 KM/H OR LESS | NAVIGATION PROVIDES DRIVING ROAD INFORMATION | NO DROWSY AND CARELESS DRIVING CONDITION | IT IS ABLE TO RECOGNIZE ALL GESTURES, WHEN VEHICLE SPEED IS 0 OR WHEN VEHICLE IS STOPPED IN P STAGE |
| Head Action | Nod | | ROTATION STATE OF 30° OR LESS OF STEERING WHEEL | NOT APPLICABLE | GAZE OF DRIVER IS TOWARD THE FRONT FOR 1 SECOND OR MORE FOR 2 SECONDS JUST BEFORE GESTURE RECOGNITION, AND BOTH HANDS OF DRIVER ARE LOCATED ON STEERING WHEEL | IT IS ABLE TO RECOGNIZE GESTURE, ALTHOUGH GESTURE RECOGNIZABLE CONDITION IS NOT MET WHEN EXECUTING AUTONOMOUS DRIVING FUNCTION IN HIGHWAY CONDITION |
| | Shake | | ROTATION STATE OF 30° OR LESS OF STEERING WHEEL | NOT APPLICABLE | | |
| Head Gesture | | Thumb Up | ROTATION STATE OF 30° OR LESS OF STEERING WHEEL | ABOVE EXPRESSWAY: VEHICLE SPEED OF (100) KM/H OR LESS OTHER ROADS: VEHICLE SPEED OF (60) KM/H OR LESS | GAZE OF DRIVER IS TOWARD THE FRONT FOR 1 SECOND OR MORE FOR 2 SECONDS JUST BEFORE GESTURE RECOGNITION, AND ONE HAND OF DRIVER IS LOCATED ON STEERING WHEEL | IT IS ABLE TO RECOGNIZE GESTURE, ALTHOUGH GESTURE RECOGNIZABLE CONDITION IS NOT MET WHEN EXECUTING AUTONOMOUS DRIVING FUNCTION IN HIGHWAY CONDITION |
| | | Silence | | | | |
| | | OK | | | | |
| | | No.1/2/3 | | | | |
| | | Thumb left | | | | |
| | | Thumb right | | | | |
| | | Palm | | | | |
| | Wave hand (left, right) | | ROTATION STATE OF 20° OR LESS OF STEERING WHEEL VEHICLE SPEED OF 60 KM/H OR LESS | GENERAL ROAD | | SET TO SEPARATE CONDITION, BECAUSE WAVING YOUR HAND (ARM) TO THE LEFT OR RIGHT CAN CAUSE CARELESS DRIVING |

FIG. 4

| SCENARIO | INFOTAINMENT SYSTEM STATE | RECOGNIZE GESTURE THAT CAN BE ENTERED | APPLICATION | DESCRIPTION |
|---|---|---|---|---|
| POP UP | POP UP | Nod/Shake | System(POP UP) AI Agent | OK, NO OPERATION |
| Start Guidance | Navi | Nod | Navi App AI Agent | START GUIDANCE WHEN RECEIVING NOD |
| CONTENT STORAGE | Media/Radio | Thumb up | Media/Radio AI Agent | EXECUTE FAVORITES/RECOMMENDATION /STORAGE FUNCTION |
| PAUSE | Media | Silence | Media AI Agent | MUTE OPERATION |
| PLAY | Media | OK | Media AI Agent | PLAY OPERATION |
| Start Guidance | Navi | OK | Navi AI Agent | START GUIDANCE WHEN RECEIVING OK |
| ADD POI FAVORITES | Navi | Thumb up | Navi AI Agent | ADD POI FAVORITES WHEN RECEIVING THUMB UP |
| Choose 1,2,3 | VR/Navi | No.1/2/3 | VR/Navi | RECOGNIZE THAT SELECTION FUNCTION > 1, 2, 3 : CHOOSE |
| Track Up/Down Seek Up/Down | Media/Radio | Wave hand (left, right) | Media/Radio | NEXT SONG/PREVIOUS SONG (SEEK UP/DOWN) |
| End | Always (not media) | Thumb left | System | END (GO BACK) PERFORM GESTURE RECOGNITION ON ONLY SCREEN HAVING BACK BUTTON |
| Previous song/page | Media | Thumb left | Media | Seek up |
| Next song/page | Media | Thumb right | Media | Seek down |
| Home | Always | Palm | System | HOME SCREEN SWITCHING |

APPARATUS FOR RECOGNIZING GESTURE IN VEHICLE AND METHOD THEREOF

CROSS-REFERENCE TO RELATED APPLICATION

This application claims under 35 U.S.C. § 119(a) the benefit of Korean Patent Application No. 10-2021-0116581, filed in the Korean Intellectual Property Office on Sep. 1, 2021, the entire contents of which are incorporated herein by reference.

BACKGROUND

(a) Technical Field

The present disclosure relates to an apparatus for recognizing a gesture in a vehicle and a method thereof, more particularly, to the apparatus for efficiently recognizing a gesture by interworking with an infotainment system.

(b) Description of the Related Art

A feature of recognizing a gesture of a user who is riding in a vehicle and performing various vehicle control commands based on the recognized gesture has been incorporated into new vehicles. Particularly, the recognized gesture may be used to control an infotainment system of the vehicle to increase convenience of the user. A camera, a radar, other sensors, and the like may be used in the process of recognizing the gesture of the user in the vehicle. Furthermore, the gesture may be determined according to a situation set by the user.

According to an existing gesture recognition method, an interior camera must be continuously operated. This may cause a problem such as overload and reliability degradation of the camera and the processor. Thus, there is a need for a gesture recognition method which is more efficient than the existing gesture recognition method.

SUMMARY

An aspect of the present disclosure provides an apparatus for efficiently recognizing a gesture by interworking with an infotainment system and a method thereof.

Another aspect of the present disclosure provides an apparatus for recognizing a gesture in a vehicle to address an overload problem according to continuous image recognition and a method thereof.

Another aspect of the present disclosure provides an apparatus for recognizing a gesture in a vehicle to address a reliability degradation problem according to continuous image recognition and a method thereof.

Another aspect of the present disclosure provides an apparatus for recognizing a gesture in a vehicle to reduce a probability that a gesture corresponding to a situation is incorrectly recognized as an unrelated gesture, when the gesture corresponding to the situation is input, and a method thereof.

Another aspect of the present disclosure provides an apparatus for recognizing a gesture in a vehicle to propose a gesture suitable for a situation to a user to increase user convenience and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for recognizing a gesture in a vehicle may include a sensor device provided in the vehicle to obtain information about a gesture of a user and a processor that is connected with an infotainment system of the vehicle to identify a state of the infotainment system, branch a gesture allowed in recognition, based on the state of the infotainment system, and perform gesture recognition, based on the information about the gesture sensed by the sensor device and the result of branching the gesture allowed in recognition.

As used herein, the term "branch a gesture" refers to classifying a gesture that is recognized by the apparatus based on the state of the infotainment system of the vehicle such that the gesture can be recognized. For example, the branching can be performed so as to recognize the gesture based on predetermined gesture(s) stored in advance in memory.

In an embodiment, the processor may determine whether it is possible use the gesture recognition or whether it is possible to use gesture recognition for a specific gesture, based on at least one of driving information of the vehicle, information about a road where the vehicle is traveling, or information about a state of the user, the state being identified by the sensor device.

In an embodiment, the processor may determine whether it is possible use the gesture recognition or whether it is possible to use the gesture recognition for the specific gesture, depending on whether a vehicle speed of the vehicle is less than or equal to a threshold speed.

In an embodiment, the processor may determine whether it is possible use the gesture recognition or whether it is possible to use the gesture recognition for the specific gesture, depending on whether a steering wheel angle of the vehicle is less than or equal to a threshold angle.

In an embodiment, the processor may determine whether it is possible use the gesture recognition, based on whether the information about the road is provided through a navigation system of the vehicle.

In an embodiment, the processor may determine whether it is possible use the gesture recognition or whether it is possible to use the gesture recognition for the specific gesture, depending on whether a vehicle speed of the vehicle is less than or equal to a threshold speed set according to a type of the road.

In an embodiment, the processor may determine whether it is possible use the gesture recognition or whether it is possible to use the gesture recognition for the specific gesture, depending on a type of the road.

In an embodiment, the processor may determine whether it is possible use the gesture recognition, based on whether information about the user sensed by the sensor device corresponds to a predetermined drowsy or careless state condition.

In an embodiment, the processor may determine whether it is possible to use the gesture recognition for the specific gesture, based on at least one of a gaze of the user or a steering wheel holding state of the user.

In an embodiment, the processor may process the case where the vehicle is stopped or where an autonomous driving function is running as an exception condition and may determine that it is possible to use the gesture recognition or that it is possible to use the gesture recognition for the specific gesture, when the vehicle is stopped or when the autonomous driving function is running.

In an embodiment, the apparatus may further include a driving device that is connected with the sensor device and adjusts a direction where the sensor device senses information about a gesture of the user. The processor may adjust the direction where the sensor device senses the information about the gesture of the user, by the driving device, such that the sensor device obtains information about the gesture allowed in recognition.

In an embodiment, the apparatus may further include a feedback device that outputs feedback by a voice signal, a display, or driving. The processor may output feedback on the result of the gesture recognition by the feedback device, based on the result of the gesture recognition.

In an embodiment, the processor may select a priority of control for the infotainment system corresponding to the gesture, based on an infotainment system state of the vehicle and may determine control for the infotainment system corresponding to the gesture, based on the information about the gesture sensed by the sensor device and the priority.

In an embodiment, the state of the infotainment system may include at least one of a state where a pop-up screen is activated, a state where a navigation application is first activated, a state where a media application is first activated, or a state where a radio is first activated.

According to another aspect of the present disclosure, a method for recognizing a gesture in a vehicle may include obtaining, by a sensor device provided the vehicle, information about a gesture of a user, being, by a processor, connected with an infotainment system of the vehicle to identify a state of the infotainment system, branching, by the processor, a gesture allowed in recognition, based on the state of the infotainment system, and performing, by the processor, gesture recognition, based on the information about the gesture sensed by the sensor device and the result of branching the gesture allowed in recognition.

In an embodiment, the method may further include determining, by the processor, whether it is possible use the gesture recognition or whether it is possible to use gesture recognition for a specific gesture, based on at least one of driving information of the vehicle, information about a road where the vehicle is traveling, or information about a state of the user, the state being identified by the sensor device.

In an embodiment, the determining of whether it is possible use the gesture recognition or whether it is possible to use the gesture recognition for the specific gesture by the processor may include determining, by the processor, whether it is possible use the gesture recognition or whether it is possible to use the gesture recognition for the specific gesture, depending on whether a vehicle speed of the vehicle is less than or equal to a threshold speed or whether a steering wheel angle of the vehicle is less than or equal to a threshold angle.

In an embodiment, the determining of whether it is possible use the gesture recognition or whether it is possible to use the gesture recognition for the specific gesture by the processor may include determining, by the processor, whether it is possible use the gesture recognition or whether it is possible to use the gesture recognition for the specific gesture, depending on whether a vehicle speed of the vehicle is less than or equal to a threshold speed set according to a type of the road.

In an embodiment, the determining of whether it is possible use the gesture recognition or whether it is possible to use the gesture recognition for the specific gesture by the processor may include determining, by the processor, whether it is possible use the gesture recognition or whether it is possible to use the gesture recognition for the specific gesture, based on at least one of a gaze of the user or a steering wheel holding state of the user.

In an embodiment, the method may further include selecting, by the processor, a priority of control corresponding to the gesture, based on an infotainment system state of the vehicle and determining, by the processor, control corresponding to the gesture, based on the information about the gesture sensed by the sensor device and the priority.

BRIEF DESCRIPTION OF THE DRAWINGS

The above and other objects, features and advantages of the present disclosure will be more apparent from the following detailed description taken in conjunction with the accompanying drawings:

FIG. 4 is a drawing illustrating a gesture recognition possible condition for an apparatus for recognizing a gesture in a vehicle according to an embodiment of the present disclosure;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

Figure 1:
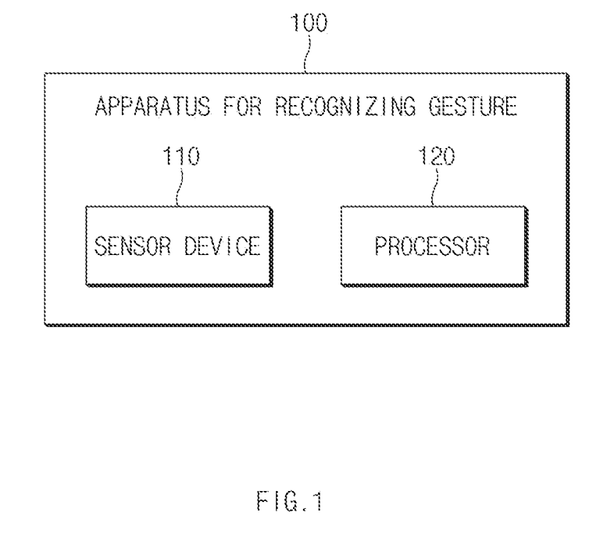
FIG. 1 is a block diagram illustrating an apparatus for recognizing a gesture in a vehicle according to an embodiment of the present disclosure.

FIG. 1 is a block diagram illustrating an apparatus for recognizing a gesture in a vehicle according to an embodiment of the present disclosure.

Referring to FIG. 1, an apparatus 100 for recognizing a gesture in a vehicle may include a sensor device 110 and a processor 120.

The apparatus 100 for recognizing the gesture in the vehicle according to an embodiment of the present disclosure may be implemented inside or outside a vehicle. In this case, the apparatus 100 for recognizing the gesture in the vehicle may be integrally configured with control units in the vehicle or may be implemented as a separate hardware device to be connected with the control units of the vehicle by a connection means.

As an example, the apparatus 100 for recognizing the gesture in the vehicle may be integrally configured with the vehicle or may be implemented as a configuration independent of the vehicle in the form of being installed/attached to the vehicle. Alternatively, a part of the apparatus 100 for recognizing the gesture in the vehicle may be integrally configured with the vehicle or the other may be implemented as a configuration independent of the vehicle in the form of being installed/attached to the vehicle.

The sensor device 110 may be provided in the vehicle to obtain information about a gesture of a user.

The sensor device 110 may preferably include a camera to obtain an image about a gesture of the user, but not limited thereto. The sensor device 110 may be configured to include a radar or other sensors to obtain information about a gesture of the user.

As an example, the sensor device 110 may be provided in an artificial intelligence (AI) agent of the vehicle.

The AI agent may be a device implemented to identify current states of a vehicle and a driver, detect various inputs around the vehicle and the driver to provide the driver and a passenger with a corresponding service.

The AI agent may detect an input such as a voice, an expression, or a gesture from the user, by speech recognition or image recognition, and may provide feedback through a display or a speaker.

The processor 120 may be electrically connected with the sensor device 110, a driving device, a feedback device, and the like, which will be described below, and may electrically control the respective components. The processor 120 may be an electrical circuit which executes instructions of software and may perform a variety of data processing and calculation described below.

The processor 120 may be preferably provided in an infotainment system of the vehicle, but may be provided in the AI agent or may be provided as a separate device.

The processor 120 may be connected with the infotainment system of the vehicle to identify a state of the infotainment system.

The infotainment system of the vehicle may display information about the vehicle or may provide an infotainment content, by the display and the speaker.

The infotainment system of the vehicle may manage and control the AI agent and may perform speech recognition.

The infotainment system of the vehicle may include a navigation or an audio, video, navigation (AVN).

The infotainment system of the vehicle may play media, may perform a radio function, may provide vehicle information, and perform control associated with other systems.

As an example, the state of the infotainment system may include at least one of a state where a pop-up screen is activated, a state where a navigation application is first activated, a state where a media application is first activated, or a state where a radio is first activated.

The state where the pop-up screen is activated may refer to a state where a pop-up window is activated on a display of the infotainment system and where a function of a system corresponding to the pop-up window is first activated.

The state where the navigation application is first activated may refer to a state where a UI/UX for a navigation function is displayed on the display and where the user input corresponds to a command to perform control about the navigation function.

The state where the media application is first activated may refer to a state where a UI/UX for a media function such as playback of music or video or a game is displayed on the display and where the user input corresponds to a command to perform control about a media application function.

The state where the radio is first activated may refer to a state where a UI/UX for a radio function is displayed on the display and where the user input corresponds to a command to perform control about the radio function.

The processor 120 may branch a gesture allowed in recognition, based on the state of the infotainment system.

As an example, the processor 120 may classify a gesture which is allowed in recognition and a gesture which is not allowed in recognition, depending on information about the gesture allowed in recognition, corresponding to the state of the infotainment system, which is previously stored in the memory.

As an example, the processor 120 may determine whether each of various types of gestures is a gesture which is allowed in recognition or a gesture which is not allowed in recognition to branch the gesture allowed in recognition.

The processor 120 may perform gesture recognition, based on information about the gestured sensed by the sensor device 110 and the result of branching the gesture allowed in recognition.

As an example, the processor 120 may recognize a gesture of the user, by image analysis based on an image for the gesture sensed by the sensor device 110 and may determine whether the recognized gesture is a gesture allowed in recognition, depending on the current state of the infotainment system to finally determine the gesture.

The processor 120 may determine whether it is possible use gesture recognition or whether it is possible to use gesture recognition for a specific gesture, based on at least one of driving information of the vehicle, information about a road where the vehicle is traveling, or information about a state of the user, which is identified by the sensor device 110.

As an example, the processor 120 may recognize a gesture in a condition determined that the user may safely perform an input through each gesture, based on at least one of driving information of the vehicle, information about a road where the vehicle is traveling, or information about a state of the user, which is identified by the sensor device 110.

As an example, the processor 120 may determine whether it is possible to use gesture recognition or whether it is possible to use gesture recognition for a specific gesture, depending on whether the vehicle speed of the vehicle is less than or equal to a threshold speed.

In particular, the processor 120 may perform the entire gesture recognition, only when the vehicle speed of the vehicle is less than or equal to the threshold speed. The processor 120 may reduce the amount of calculation about gesture recognition, by not performing gesture recognition when the vehicle speed of the vehicle is not less than or equal to the threshold speed.

Furthermore, only when the vehicle speed of the vehicle is less than or equal to the threshold speed corresponding to a specific gesture, the processor 120 may recognize the gesture. When the vehicle speed of the vehicle is not less than or equal to the threshold speed corresponding to the specific gesture, the processor 120 may not recognize the gesture to reduce the amount of calculation about gesture recognition.

As an example, the processor 120 may determine whether it is possible to use gesture recognition or whether it is possible to use gesture recognition for a specific gesture, depending on whether a steering wheel angle of the vehicle is less than or equal to a threshold angle.

In particular, the processor 120 may perform the entire gesture recognition, only when the steering wheel angle of the vehicle is less than or equal to the threshold angle. The processor 120 may reduce the amount of calculation about gesture recognition, by not recognizing the gesture when the steering wheel angle of the vehicle is not less than or equal to the threshold angle.

Furthermore, only when the steering wheel angle of the vehicle is less than or equal to the threshold angle corresponding to a specific gesture, the processor 120 may recognize the gesture. When the steering wheel angle of the vehicle is not less than or equal to the threshold angle corresponding to the specific gesture, the processor 120 may not recognize the gesture to reduce the amount of calculation about gesture recognition.

As an example, the processor 120 may determine whether it is possible to use gesture recognition, based on whether information about the road is provided through the navigation system of the vehicle.

In particular, when the information about the road is not provided through the navigation system of the vehicle, the processor 120 may determine that the road where the vehicle is traveling is a dangerous road and may not recognize a gesture to reduce the amount of calculation about gesture recognition.

As an example, the processor 120 may determine whether it is possible to use gesture recognition or whether it is possible to use gesture recognition for a specific gesture, depending on whether the vehicle speed of the vehicle is less than or equal to a threshold speed set according to a type of the road.

The road where the vehicle is traveling may have the speed limit determined according to a corresponding road type such as an expressway, a highway, or a general road.

In particular, the processor 120 may perform the entire gesture recognition, only when the vehicle speed of the vehicle is less than or equal to a threshold speed corresponding to a road type. When the vehicle speed of the vehicle is not less than or equal to the threshold speed corresponding to the road type, the processor 120 may not recognize the gesture to reduce the amount of calculation about gesture recognition.

Furthermore, only when the vehicle speed of the vehicle is less than or equal to a threshold speed according to a road type corresponding to a specific gesture, the processor 120 may recognize the gesture. When the vehicle speed of the vehicle is not less than or equal to the threshold speed according to the road type corresponding to the specific gesture, the processor 120 may not recognize the gesture to reduce the amount of calculation about gesture recognition.

As an example, the processor 120 may determine whether it is possible to use gesture recognition or whether it is possible to use gesture recognition for a specific gesture, depending on a type of the road.

In particular, the processor 120 may perform the entire gesture recognition, only when the road where the vehicle is traveling corresponds to a predetermined road type where it is impossible to use gesture recognition. When the road where the vehicle is traveling does not correspond to the predetermined road type where it is possible to use the gesture recognition, the processor 120 may not recognize the gesture to reduce the amount of calculation about gesture recognition.

Furthermore, only when the road where the vehicle is traveling corresponds to a road type allowed in gesture recognition in response to a specific gesture, the processor 120 may recognize the gesture. When the road where the vehicle is traveling does not correspond to the road type allowed in gesture recognition in response to the specific gesture, the processor 120 may not recognize the gesture to reduce the amount of calculation about gesture recognition.

As an example, the processor 120 may determine whether it is possible to use gesture recognition, based on whether information about the user sensed by the sensor device 110 corresponds to a predetermined drowsy or careless state condition.

As an example, the processor 120 may analyze a head, eyelids, pupils, or the like of the user sensed by the sensor device 110 from an image of the user to determine whether the user corresponds to the predetermined drowsy or careless state condition and may perform gesture recognition only when the user corresponds to the predetermined drowsy or careless state condition. As an example, when the information about the user sensed by the sensor device 110 corresponds to the predetermined drowsy or careless state condition, the processor 120 may not recognize a corresponding gesture to reduce the amount of calculation about gesture recognition.

As an example, the processor 120 may determine whether it is possible to use gesture recognition for a specific gesture, based on at least one of a gaze of the user or a steering wheel holding state of the user.

As an example, the processor 120 may analyze an image of the user sensed by the sensor device 110 to determine whether the gaze of the user is toward the front during a specified time just before gesture recognition.

As an example, the processor 120 may determine whether both hands of the user are located on the steering wheel or whether one hand of the user is located on the steering wheel, by a pressure sensor, a thermal sensor, or an electrode sensor provided in the steering wheel.

As an example, only when the gaze of the user is toward the front during a specific time just before gesture recognition for a specific gesture and both hand of the user are located on the steering wheel, the processor 120 may recognize the gesture.

As an example, only when the gaze of the user is toward the front during a specific time just before gesture recognition for another specific gesture and one hand or more of the user are located on the steering wheel, the processor 120 may recognize the gesture.

As an example, the processor 120 may process the case where the vehicle is stopped or where the autonomous driving function is running as an exception condition. When the vehicle is stopped or when the autonomous driving function is running, the processor 120 may determine that it is possible to use gesture recognition or that it is possible to use gesture recognition for a specific gesture.

As an example, the processor 120 may determine whether the vehicle speed of the vehicle is "0" or whether the gear stage of the vehicle is a P stage by a vehicle system.

As an example, the processor 120 may determine whether the vehicle is executing an autonomous driving function or a driving assistance function by an autonomous driving system of the vehicle.

As an example, when the vehicle is stopped or when the autonomous driving function is running, the processor 120 may determine that it is not dangerous although the user performs an input through a gesture and may perform the entire gesture recognition and gesture recognition for a specific gesture.

As an example, the apparatus 100 for recognizing the gesture in the vehicle may further include a driving device which is connected with the sensor device 110 to adjust a direction where the sensor device 110 senses information about a gesture of the user.

As an example the driving device may include a drive motor which is provided in the AI agent and is physically connected with the sensor device 110 to adjust a direction where the sensor device 110 senses information about a gesture of the user.

As an example, the processor 120 may adjust a direction where the sensor device 110 senses information about a gesture of the user, by the driving device, such that the sensor device 110 obtains information about a gesture allowed in recognition.

As an example, the processor 120 may adjust a direction where the sensor device 110 senses information about a gesture of the user in the direction of the head of the user, when the gesture allowed in recognition is a gesture using the head, and may adjust a direction where the sensor device 110 senses information about a gesture of the user in the direction of the hand of the user, when the gesture allowed in recognition is a gesture using the hand.

As an example, the apparatus 100 for recognizing the gesture in the vehicle may further include a feedback device which outputs feedback by a voice signal, a display, or driving.

As an example, the feedback device may include at least one of a display, a speaker, or a drive motor provided in the AI agent.

As an example, the processor 120 may output feedback on the result of the gesture recognition through the feedback device, based on the result of the gesture recognition.

As an example, the processor 120 may output a guidance sound, motion of the display, motion of the AI agent, or motion of the sensor device 110, based on the result of the gesture recognition.

As an example, the processor 120 may output an expression corresponding to the result of the gesture recognition through the display included in the feedback device.

As an example, the processor 120 may select a priority of control for the infotainment system corresponding to a gesture, based on the state of the infotainment system of the vehicle and may determine to control the infotainment system corresponding to the gesture, based on information about the gesture sensed by the sensor device 110 and the priority.

As an example, when the same gesture corresponds to various control depending on the state of the infotainment system of the vehicle, the processor 120 may assign a priority of control corresponding to the gesture, in an order of functions currently first activated on the infotainment system of the vehicle.

As an example, when the same gesture corresponds to various control depending on the state of the infotainment system of the vehicle, the processor 120 may assign a priority of control corresponding to the gesture to operate only control corresponding to gesture recognition for a function currently activated on the foreground of the infotainment system of the vehicle.

Illustratively, when a navigation road guidance start screen is activated while media is played, only control corresponding to gesture recognition for a navigation road guidance scenario activated on the foreground may be performed.

Figure 2:
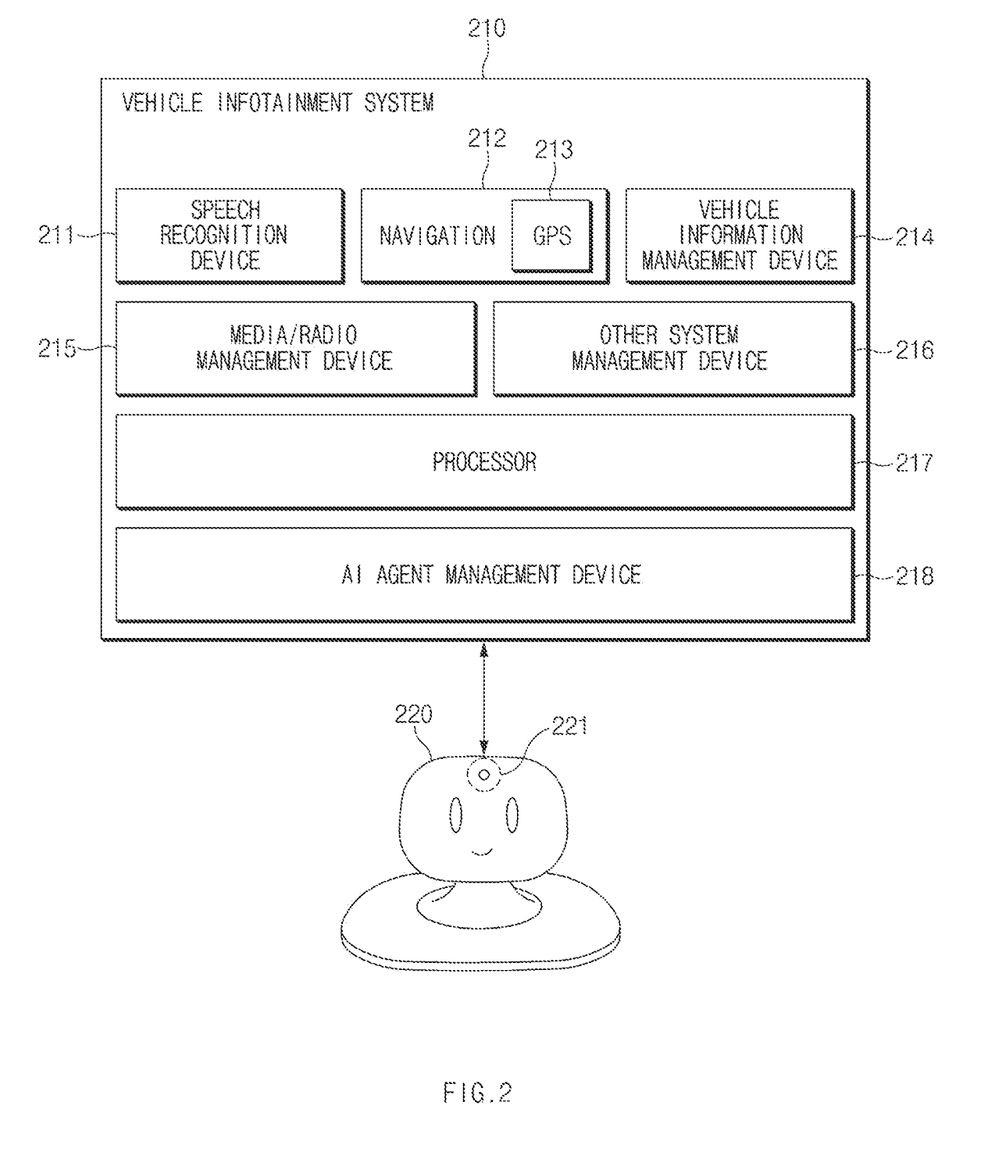
FIG. 2 is a drawing illustrating a detailed configuration of an apparatus for recognizing a gesture in a vehicle according to another embodiment of the present disclosure.

FIG. 2 is a drawing illustrating a detailed configuration of an apparatus for recognizing a gesture in a vehicle according to another embodiment of the present disclosure.

Referring to FIG. 2, a vehicle infotainment system 210 may include a speed recognition device 211, a navigation 212, a vehicle information management device 214, a media/radio management device 215, an other system management device 216, a processor 217, and an AI agent management device 218.

The navigation 212 may include a global positioning system (GPS) 213.

The vehicle infotainment system 210 may be provided in a head unit (HU) of the vehicle.

The vehicle infotainment system 210 may control an AI agent 220.

The vehicle infotainment system 210 may identify a current system state by an infotainment system and vehicle information and may branch a gesture corresponding to the identified current system state.

The vehicle infotainment system 210 may transmit a gesture collection command and a feedback command to the AI agent 220.

The speed recognition device 211 may execute and manage a speech recognition function.

The speed recognition device 211 may utter text to speech (TTS) of the AI agent 220 and may analyze a voice command of a user by the AI agent 220.

The navigation 212 may manage and deliver information about a current position of the vehicle to another device.

The navigation 212 may execute and manage a navigation-related function such as a road guidance function.

The vehicle information management device 214 may obtain and manage vehicle information outside the infotainment system, for example, information obtained by an advanced driver assistance systems (ADAS) sensor provided in the vehicle, speed information of the vehicle, or the like.

The media/radio management device 215 may perform and manage a function associated with playback of music stored in a USB, music paired through Bluetooth, or streamed music.

The media/radio management device 215 may execute and manage a radio-related function.

The other system management device 216 may manage information which is not managed by another device and system state information and may control to output a pop-up window.

The processor 217 may perform a function described by a processor 120 of FIG. 1.

The processor 217 may determine a gesture which needs to be currently collected, using state information of the infotainment system and vehicle information and may compare and analyze information obtained by the AI agent 220 with information about the gesture which needs to be currently collected to determine the gesture.

The processor 217 may transmit a feedback command according to the determined result to the AI agent 220.

The AI agent management device 218 may receive information from the AI agent 220 and may manage the received information.

The AI agent management device 218 may control an operation of the AI agent 220, including voice guidance, screen display, and a rotation operation.

The AI agent 220 may be connected with the vehicle infotainment system 210.

The AI agent 220 may include a sensor device 221.

The sensor device 221 may include a camera which obtains an image about a gesture.

As the user of the vehicle inputs a gesture operation and command, the AI agent 220 may collect an image about a gesture.

The AI agent 220 may be configured to include a display for providing the user with visual feedback and a motor for adjusting a direction of the sensor device 221.

The AI agent 220 may output a guidance sound to the user or may output an expression, information, and the like through the display to provide feedback.

Figure 3:
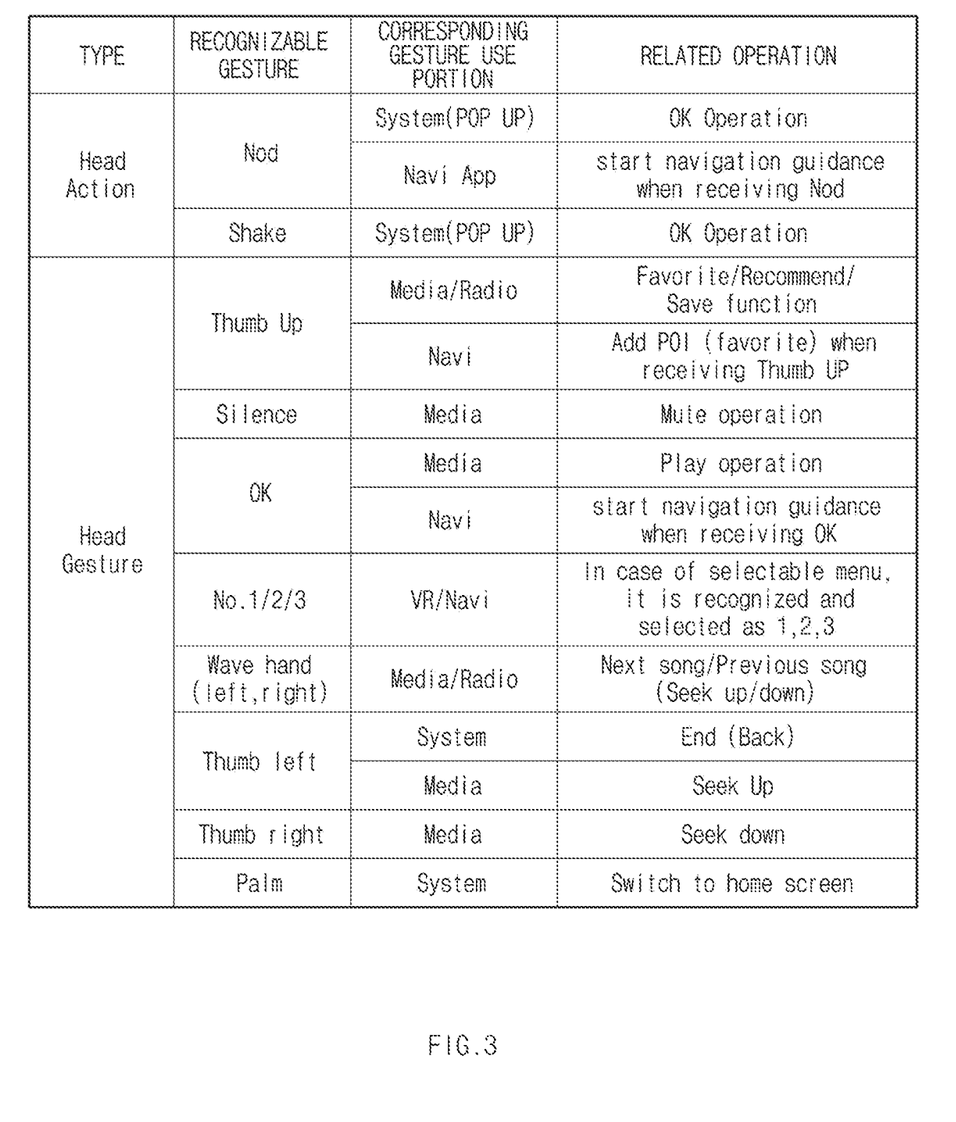
FIG. 3 is a drawing illustrating a type of a gesture capable of being input to an apparatus for recognizing a gesture in a vehicle according to an embodiment of the present disclosure.

FIG. 3 is a drawing illustrating a type of a gesture capable of being input to an apparatus for recognizing a gesture in a vehicle according to an embodiment of the present disclosure.

Referring to FIG. 3, a gesture capable of being input to an apparatus 100 for recognizing a gesture in a vehicle may be divided into Head Action and Hand Gesture.

Head Action may refer to a gesture expressed by motion of the head, and Hand Gesture may refer to a gesture expressed by motion of the hand.

Head Action may include "Nod" and "Shake" as analyzable gestures.

"Nod" may be a head nod gesture, which may correspond to control of performing an OK Operation, with respect to a state where a pop-up system is activated.

Furthermore, "Nod" may correspond to control of starting navigation directions, with respect to a state where a navigation application is activated.

"Shake" may be a head shake gesture, which may correspond to control of performing an NO Operation, with respect to a state where the pop-up system is activated.

Hand Gesture may include Thumb Up, Silence, OK, No. 1/2/3, Wave hand (left, right), Thumb left, Thumb right, and Palm as analyzable gestures.

Thumb Up may be a thumb up gesture, which may correspond to control of setting, recommend, or storing activated content to favorites, with respect to a state where media or a radio is activated.

Furthermore, Thumb Up may correspond to control of setting the activated position to a point of interest, with respect to a state where the navigation application is activated.

Silence may be a gesture to raise the index finger, which may correspond to control of activating a mute function, with respect to a state where media is activated.

OK may be a gesture to make an OK shape with the hand by attaching the tips of the thumb and the index finger of one hand to make a round shape, which may correspond to control of performing a play operation, with respect to a state where media is activated.

Furthermore, OK may correspond to control of starting navigation directions, with respect to a state where the navigation application is activated.

No. 1/2/3 may be a gesture to spread one, two, or three fingers, which may correspond to control of selecting a menu corresponding to each number in a situation capable of selecting several menus, with respect to a state where the navigation application is activated.

Wave hand (left, right) may be a gesture to wave to the left or right, which may correspond to control of moving to next music/channel/content or previous music/channel/content, with respect to a state where the media or the radio is activated.

Thumb left may be a thumb left gesture, which may correspond to control of performing the end or back of the system, in a system function.

Furthermore, Thumb left may correspond to control of performing an up search function, with respect to a state where the media is activated.

Thumb right may be a thumb right gesture, which may correspond to control of performing a down search function, with respect to a state where the media is activated.

Palm may be a gesture to open the palm, which may correspond to control of returning to a home screen, in the system function.

Only when there is a corresponding gesture, with respect to a state of the infotainment system, the apparatus 100 for recognizing the gesture in the vehicle may recognize the gesture.

Thus, when the current state of the infotainment system is determined, the apparatus 100 for recognizing the gesture in the vehicle may select a gesture allowed in recognition and may perform gesture recognition for only the gesture allowed in recognition.

FIG. 4 is a drawing illustrating a gesture recognition possible condition for an apparatus for recognizing a gesture in a vehicle according to an embodiment of the present disclosure.

Referring to FIG. 4, when the vehicle speed is less than or equal to 130 km/h, when the navigation is providing driving road information, and when the state information of the driver, which is identified by the sensor device 110 or 221, is not a condition determined as drowsy and careless driving, an apparatus 100 for recognizing a gesture in a vehicle may determine that it is possible to perform the entire gesture recognition and may start gesture recognition.

Herein, when the vehicle speed is not less than or equal to 130 km/h, when the navigation is not providing driving road information, and when the vehicle is stopped as the vehicle speed is "0" or the vehicle is in a P stage, although the state information of the driver, which is identified by the sensor device 110 or 221, is the condition determined as the drowsy and careless driving, the apparatus 100 for recognizing the gesture in the vehicle may determine that it is possible to perform the entire gesture recognition and may start gesture recognition.

As an example, when the steering wheel angle is less than or equal to 30°, with respect to Head Action including Nod and Shake, when the gaze of the driver is toward the front for 1 second or more for 2 seconds just before gesture recognition by the sensor device 110 or 221, and when it is determined that both hands of the driver are located on the steering wheel, the apparatus 100 for recognizing the gesture in the vehicle may determine that it is possible to perform the gesture recognition to perform the gesture recognition.

Herein, when the steering wheel angle is not less than or equal to 30°, when the gaze of the driver is not toward the front for 1 second or more for 2 seconds just before gesture recognition by the sensor device 110 or 221, and when the vehicle travels on the highway and when the autonomous driving function such as smart cruise control (SCC) or highway driving assist (HDA) is executed, although it is determined that both hands of the driver are not located on the steering wheel, the apparatus 100 for recognizing the gesture in the vehicle may determine that it is possible to perform the gesture recognition to perform the gesture recognition.

When the steering wheel angle is less than or equal to 20°, with respect to Thumb Up, Silence, OK, No. 1/2/3, Thumb left, Thumb right, Palm in Hand Gesture, when a condition where the vehicle speed is less than or equal to 100 km/h on the road having the speed limit above the speed limit on the expressway and a condition where the vehicle speed is less than or equal to 60 km/h on the road except for the road having the speed limit above the speed limit on the expressway are met, when the gaze of the driver is toward the front for 1 second or more for 2 seconds just before gesture recognition by the sensor device 110 or 221, and when it is determined that one hand of the driver is located on the steering wheel, the apparatus 100 for recognizing the gesture in the vehicle may determine that it is possible to perform the gesture recognition to perform the gesture recognition.

Herein, when the steering wheel angle is not less than or equal to 20°, when the condition where the vehicle speed is less than or equal to 100 km/h on the road having the speed limit above the speed limit on the expressway or the condition where the vehicle speed is less than or equal to 60 km/h on the road except for the road having the speed limit above the speed limit on the expressway is not met, when the gaze of the driver is not toward the front for 1 second or more for 2 seconds just before gesture recognition by the sensor device 110 or 221, and when the vehicle travels on the highway and when the autonomous driving function such as SCC or HDA is executed although it is determined that one hand of the driver is not located on the steering wheel, the apparatus 100 for recognizing the gesture in the vehicle may determine that it is possible to perform the gesture recognition to perform the gesture recognition.

As an example, when the steering wheel angle is less than or equal to 20°, with respect to Wave hand (left, right) in Hand Gesture, when the vehicle speed is less than or equal to 60 km/h, when the road where the vehicle is traveling is a general road rather than an expressway or a highway, when the gaze of the driver is toward the front for 1 second or more for 2 seconds just before gesture recognition by the sensor device 110 or 221, and when it is determined that one hand or more of the driver are located on the steering wheel, the apparatus 100 for recognizing the gesture in the vehicle may determine that it is possible to perform the gesture recognition to perform the gesture recognition.

Herein, because waving your hand or arm is able to cause careless driving, the apparatus 100 for recognizing the gesture in the vehicle may add a separate certain condition and may recognize a corresponding gesture only when the added condition is met.

Herein, the vehicle speed, the steering wheel angle, the time, and the road type, which are criteria, are determined to give an example, and may be determined as other criteria, according to an embodiment.

Figure 5:
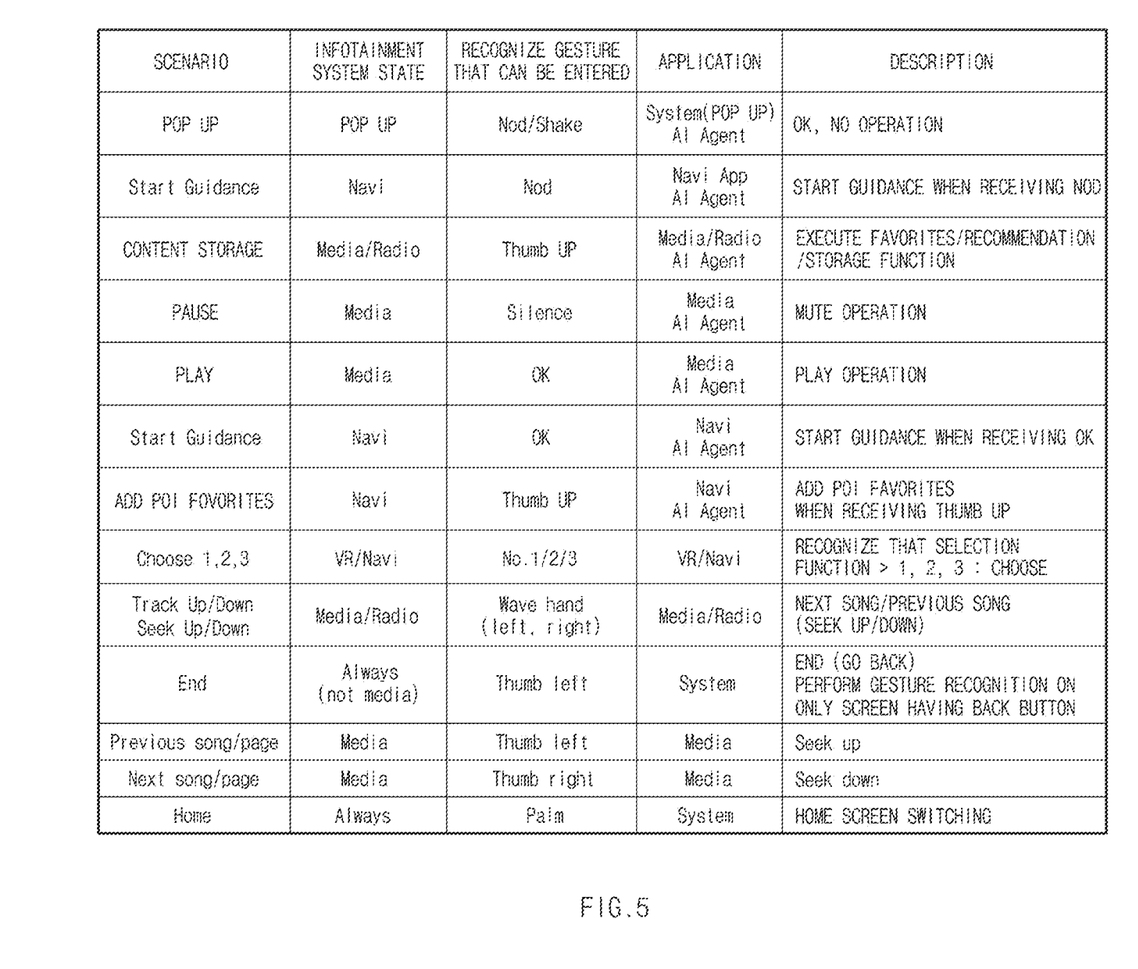
FIG. 5 is a drawing illustrating a gesture branching scenario for an apparatus for recognizing a gesture in a vehicle according to an embodiment of the present disclosure.

FIG. 5 is a drawing illustrating a gesture branching scenario for an apparatus for recognizing a gesture in a vehicle according to an embodiment of the present disclosure.

Referring to FIG. 5, a gesture branching scenario for the apparatus for recognizing the gesture in the vehicle may include scenarios of POP UP, Start Guidance, Content Storage, Pause, Play, Add POI Favorites, Choose 1/2/3, Seek up/down, End/Go Back, Previous song/page, Next song/page, and Home screen switching.

In the POP UP scenario, a Nod/Shake gesture corresponding to an OK/NO operation of a system (pop-up) or an AI agent application may be recognized, in a state where a pop-up window is activated.

In the Start Guidance scenario, a Nod gesture or an OK gesture corresponding to control of performing Start Guidance of a navigation application or the AI agent application may be recognized, in a state where a navigation function is activated.

In the Content Storage scenario, a Thumb Up gesture corresponding to control of executing a favorites/recommendation/storage function of a media/radio application or the AI agent application may be recognized, in a state where a media/radio function is activated.

In the Pause scenario, a Silence gesture corresponding to control of performing a mute operation of the media application or the AI agent application may be recognized, in a state where the media function is activated.

In the Play scenario, an OK gesture corresponding to control of performing a play operation of the media application or the AI application may be recognized, in the state where the media function is activated.

In the Add POI Favorites scenario, a Thumb Up gesture corresponding to control of adding a corresponding area of the navigation application or the AI application to POI Favorites may be recognized, in the state where the navigation function is activated.

In the Choose 1/2/3 scenario, No. 1/2/3 gesture corresponding to control of selecting a menu or an item corresponding to Number 1, 2, and 3 of the navigation application may be recognized, in the state where the navigation function is activated.

In the Seek up/down scenario, a Wave hand (left, right) gesture corresponding to control of executing a Seek up/down function of the media/radio application may be recognized, in the state where the media/radio is activated.

In the End/Go Back scenario, a Thumb left gesture corresponding to control of executing an end or go back function of the system may be recognized, in a state where any function except for the media function is activated.

In the Previous song/page scenario, a Thumb left gesture corresponding to control of executing a Seek up function of the media application may be recognized, in the state where the media function is activated.

In the Next song/page scenario, a Thumb right gesture corresponding to control of executing a Seek down function of the media application may be recognized, in the state where the media function is activated.

In the Home screen switching scenario, a Palm gesture corresponding to control of executing home screen switching of the system may be recognized, in the state where any function is activated.

Figure 6:
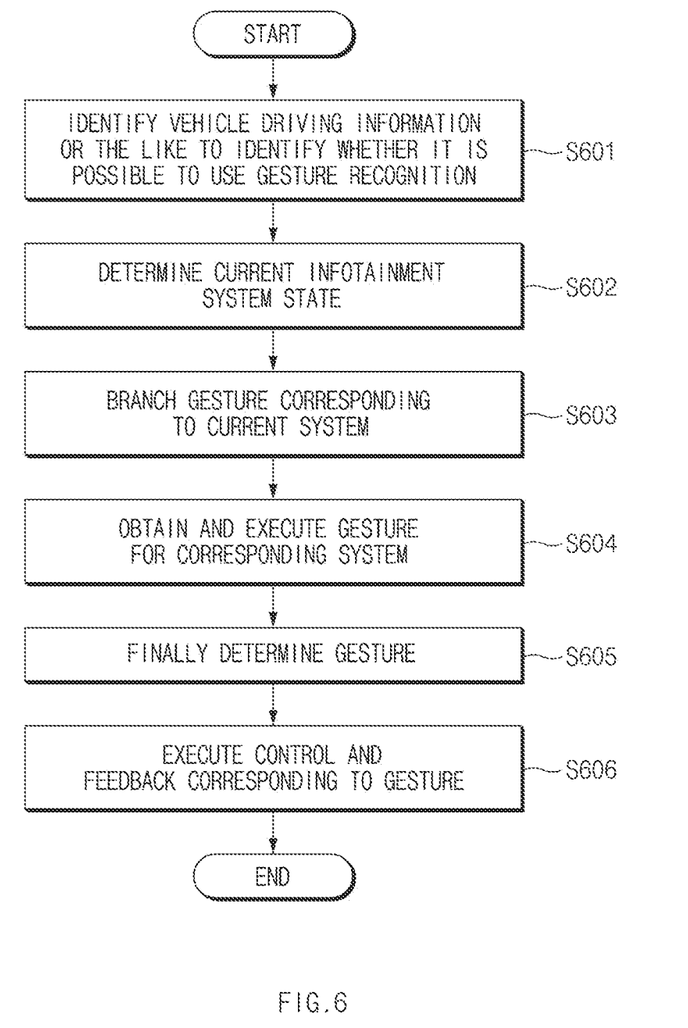
FIG. 6 is a flowchart illustrating an operation of an apparatus for recognizing a gesture in a vehicle according to an embodiment of the present disclosure.

FIG. 6 is a flowchart illustrating an operation of an apparatus for recognizing a gesture in a vehicle according to an embodiment of the present disclosure.

Referring to FIG. 6, in S601, an apparatus 100 for recognizing a gesture in a vehicle may identify vehicle driving information or the like and may identify whether it is possible to use gesture recognition.

As an example, the apparatus 100 for recognizing the gesture in the vehicle may identify vehicle driving information such as a vehicle speed or a steering wheel angle and may identify whether it is possible to use gesture recognition depending on a predetermined condition, based on at least one of the vehicle driving information, information about the road where the vehicle is traveling, or state information of a driver.

After identifying the vehicle driving information or the like and identifying whether it is possible to use the gesture recognition in S601, in S602, the apparatus 100 for recognizing the gesture in the vehicle may determine a current infotainment system state.

As an example, the apparatus 100 for recognizing the gesture in the vehicle may be connected with the infotainment system to obtain information about an infotainment system state from the infotainment system.

As an example, the infotainment system state may include a state determined according to a function first executed on the system, for example, a state where a pop-up screen is activated, a state where a navigation application is first activated, a state where a media application is first activated, or a state where a radio is first activated.

After determining the current infotainment system state in S602, in S603, the apparatus 100 for recognizing the gesture in the vehicle may branch a gesture corresponding to the current system.

As an example, the apparatus 100 for recognizing the gesture in the vehicle may branch a gesture allowed according to the current system state to detect only a gesture corresponding to control capable of being executed in the current system state.

After branching the gesture corresponding to the current system in S603, in S604, the apparatus 100 for recognizing the gesture in the vehicle may obtain a gesture for the system.

As an example, the apparatus 100 for recognizing the gesture in the vehicle may obtain and analyze information about a gesture of a user by a sensor device 110 or 221 of FIG. 1 or 2.

After obtaining the gesture for the system in S604, in S605, the apparatus 100 for recognizing the gesture in the vehicle may finally determine a gesture.

As an example, the apparatus 100 for recognizing the gesture in the vehicle may compare the analyzed gesture with a gesture allowed according to the current system state, which is branched.

After finally determining the gesture in S605, in S606, the apparatus 100 for recognizing the gesture in the vehicle may execute control and feedback corresponding to the gesture.

As an example, the apparatus 100 for recognizing the gesture in the vehicle may control the infotainment system corresponding to the gesture and may output feedback through a voice signal, a display, or driving, by a feedback device.

Figure 7:
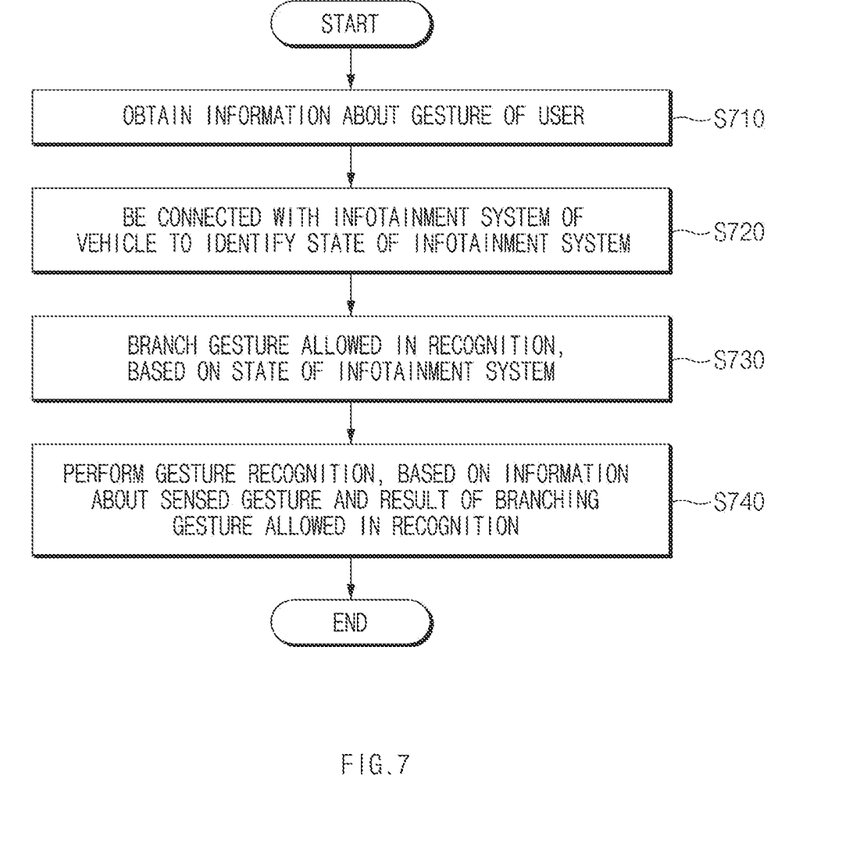
FIG. 7 is a flowchart illustrating a method for recognizing a gesture in a vehicle according to an embodiment of the present disclosure.

FIG. 7 is a flowchart illustrating a method for recognizing a gesture in a vehicle according to an embodiment of the present disclosure.

Referring to FIG. 7, the method for recognizing the gesture in the vehicle may include obtaining (S710) information about a gesture of a user, being connected (S720) with an infotainment system of a vehicle and identifying a state of the infotainment system, branching (S730) a gesture allowed in recognition, based on the state of the infotainment system, and performing (S740) gesture recognition, based on information about the sensed gesture and the result of branching the gesture allowed in recognition.

The obtaining (S710) of the information about the gesture of the user may be performed by a sensor device 110 or 221 of FIG. 1 or 2.

The connecting (S720) with the infotainment system of the vehicle and the identifying of the infotainment system may be performed by a processor 120 or 217 of FIG. 1 or 2.

The branching (S730) of the gesture allowed in recognition, based on the state of the infotainment system may be performed by the processor 120 or 217.

The performing (S740) of the gesture recognition, based on the information about the sensed gesture and the result of branching the gesture allowed in recognition may be performed by the processor 120 or 217.

As an example, the method for recognizing the gesture in the vehicle may further include determining, by the processor 120 or 217, whether it is possible use gesture recognition or whether it is possible to use gesture recognition for a specific gesture, based on at least one of driving information of the vehicle, information about a road where the vehicle is traveling, or information about a state of the user, which is identified by the sensor device 110 or 221.

As an example, the determining of whether it is possible to use the gesture recognition or whether it is possible to use the gesture recognition for the specific gesture by the processor 120 or 217 may include determining, by the processor 120 or 217, whether it is possible to use the gesture recognition or whether it is possible to use the gesture recognition for the specific gesture, depending on whether a vehicle speed of the vehicle is less than or equal to a threshold speed or when a steering wheel angle of the vehicle is less than or equal to a threshold angle.

As an example, the determining of whether it is possible to use the gesture recognition or whether it is possible to use the gesture recognition for the specific gesture by the processor 120 or 217 may include determining, by the processor 120 or 217, whether it is possible to use the gesture recognition or whether it is possible to use the gesture recognition for the specific gesture, depending on whether the vehicle speed of the vehicle is less than or equal to a threshold speed set according to a type of a road.

As an example, the determining of whether it is possible to use the gesture recognition or whether it is possible to use the gesture recognition for the specific gesture by the processor 120 or 217 may include determining, by the processor 120 or 217, whether it is possible to use the gesture recognition or whether it is possible to use the gesture recognition for the specific gesture, depending on at least one of a gaze of the user or a steering wheel holding state of the user.

As an example, the method for recognizing the gesture in the vehicle may further include selecting, by the processor 120 or 217, a priority of control corresponding to a gesture, based on an infotainment system state of the vehicle, and determining, by the processor 120 or 217, control corresponding to a gesture, based on information about the gesture sensed by the sensor device 110 or 221 and a priority.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the apparatus for recognizing the gesture in the vehicle and the method thereof according to embodiments of the present disclosure.

According to at least one of embodiments of the present disclosure, the apparatus and the method thereof may be provided to efficiently recognize a gesture by interworking with an infotainment system.

According to at least one of embodiments of the present disclosure, the apparatus for recognizing the gesture in the vehicle and the method thereof may be provided to address an overload problem according to continuous image recognition.

Furthermore, according to at least one of embodiments of the present disclosure, the apparatus for recognizing the gesture in the vehicle and the method thereof may be provided to address a reliability degradation problem according to continuous image recognition.

Furthermore, according to at least one of embodiments of the present disclosure, the apparatus for recognizing the gesture in the vehicle and the method thereof may be provided to reduce a probability that a gesture corresponding to a situation is incorrectly recognized as an unrelated gesture, when the gesture corresponding to the situation is input.

Furthermore, according to at least one of embodiments of the present disclosure, the apparatus for recognizing the gesture in the vehicle and the method thereof may be provided to propose a gesture suitable for a situation to a user, thus increasing user convenience.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for recognizing a gesture in a vehicle, the apparatus comprising:
   a sensor device provided in the vehicle to obtain information about the gesture of a user; and
   a processor configured to:
   connect with an infotainment system of the vehicle to identify a state of the infotainment system,
   branch a gesture allowed in recognition, based on the state of the infotainment system,
   perform gesture recognition, based on the information about the gesture sensed by the sensor device and a result of branching the gesture allowed in recognition,
   process the case where an autonomous driving function is running as an exception condition,
   determine that it is possible to use the gesture recognition, or that it is possible to use the gesture recognition for a specific gesture, when the autonomous driving function is running,
   select a priority of control for the infotainment system corresponding to the gesture, and
   determine the control for the infotainment system corresponding to the gesture, based on the information about the gesture sensed by the sensor device and the priority,
   where same gestures corresponding to various control depending on the state of the infotainment system are assigned the priority by the processor in an order of functions currently first activated on the infotainment system, and
   wherein the state of the infotainment system includes at least one of a state where a pop-up screen is activated, a state where a navigation application is first activated, a state where a media application is first activated, or a state where a radio is first activated.

2. The apparatus of claim 1, wherein the processor determines whether it is possible use the gesture recognition or whether it is possible to use gesture recognition for the specific gesture, based on at least one of driving information of the vehicle, information about a road where the vehicle is traveling, or information about a state of the user, the state being identified by the sensor device.

3. The apparatus of claim 2, wherein the processor determines whether it is possible use the gesture recognition or whether it is possible to use the gesture recognition for the specific gesture, depending on whether a vehicle speed of the vehicle is less than or equal to a threshold speed.

4. The apparatus of claim 2, wherein the processor determines whether it is possible use the gesture recognition or whether it is possible to use the gesture recognition for the specific gesture, depending on whether a steering wheel angle of the vehicle is less than or equal to a threshold angle.

5. The apparatus of claim 2, wherein the processor determines whether it is possible use the gesture recognition, based on whether the information about the road is provided through a navigation system of the vehicle.

6. The apparatus of claim 2, wherein the processor determines whether it is possible use the gesture recognition or whether it is possible to use the gesture recognition for the specific gesture, depending on whether a vehicle speed of the vehicle is less than or equal to a threshold speed set according to a type of the road.

7. The apparatus of claim 2, wherein the processor determines whether it is possible use the gesture recognition or whether it is possible to use the gesture recognition for the specific gesture, depending on a type of the road.

8. The apparatus of claim 2, wherein the processor determines whether it is possible use the gesture recognition, based on whether information about the user sensed by the sensor device corresponds to a predetermined drowsy or careless state condition.

9. The apparatus of claim 2, wherein the processor determines whether it is possible to use the gesture recognition for the specific gesture, based on at least one of a gaze of the user or a steering wheel holding state of the user.

10. The apparatus of claim 1, further comprising:
a driving device configured to be connected with the sensor device and adjust a direction where the sensor device senses information about a gesture of the user, wherein the processor adjusts the direction where the sensor device senses the information about the gesture of the user, by the driving device, such that the sensor device obtains information about the gesture allowed in recognition.

11. The apparatus of claim 1, further comprising:
a feedback device configured to output feedback by a voice signal, a display, or driving, wherein the processor outputs feedback on the result of the gesture recognition by the feedback device, based on the result of the gesture recognition.

12. A method for recognizing a gesture in a vehicle, the method comprising:
obtaining, by a sensor device provided the vehicle, information about a gesture of a user;
being, by a processor, connected with an infotainment system of the vehicle to identify a state of the infotainment system;
branching, by the processor, a gesture allowed in recognition, based on the state of the infotainment system;
performing, by the processor, gesture recognition, based on the information about the gesture sensed by the sensor device and a result of branching the gesture allowed in recognition, process the case where an autonomous driving function is running as an exception condition,
determining that it is possible to use the gesture recognition, or that it is possible to use the gesture recognition for a specific gesture, when the autonomous driving function is running,
selecting a priority of control for the infotainment system corresponding to the gesture, and
determining the control for the infotainment system corresponding to the gesture, based on the information about the gesture sensed by the sensor device and the priority,
where same gestures corresponding to various control depending on the state of the infotainment system are assigned the priority by the processor in an order of functions currently first activated on the infotainment system, and
wherein the state of the infotainment system includes at least one of a state where a pop-up screen is activated, a state where a navigation application is first activated, a state where a media application is first activated, or a state where a radio is first activated.

13. The method of claim 12, further comprising:
determining, by the processor, whether it is possible use the gesture recognition or whether it is possible to use gesture recognition for the specific gesture, based on at least one of driving information of the vehicle, information about a road where the vehicle is traveling, or information about a state of the user, the state being identified by the sensor device.

14. The method of claim 13, wherein the determining of whether it is possible use the gesture recognition or whether it is possible to use the gesture recognition for the specific gesture by the processor includes:
determining, by the processor, whether it is possible use the gesture recognition or whether it is possible to use the gesture recognition for the specific gesture, depending on whether a vehicle speed of the vehicle is less than or equal to a threshold speed or whether a steering wheel angle of the vehicle is less than or equal to a threshold angle.

15. The method of claim 13, wherein the determining of whether it is possible use the gesture recognition or whether it is possible to use the gesture recognition for the specific gesture by the processor includes:
determining, by the processor, whether it is possible use the gesture recognition or whether it is possible to use the gesture recognition for the specific gesture, depending on whether a vehicle speed of the vehicle is less than or equal to a threshold speed set according to a type of the road.

16. The method of claim 13, wherein the determining of whether it is possible use the gesture recognition or whether it is possible to use the gesture recognition for the specific gesture by the processor includes:
determining, by the processor, whether it is possible use the gesture recognition or whether it is possible to use the gesture recognition for the specific gesture, based on at least one of a gaze of the user or a steering wheel holding state of the user.

\* \* \* \* \*